US006076067A

United States Patent [19]
Jacobs et al.

[11] Patent Number: 6,076,067
[45] Date of Patent: Jun. 13, 2000

[54] SYSTEM AND METHOD FOR INCORPORATING ORIGINATION AND DESTINATION EFFECTS INTO A VEHICLE ASSIGNMENT PROCESS

[75] Inventors: Timothy L. Jacobs, Grapevine; Barry C. Smith, Flower Mound, both of Tex.; Ellis Johnson, Atlanta, Ga.

[73] Assignee: Sabre Inc., Dallas Fort Worth Airport, Tex.

[21] Appl. No.: 08/964,875

[22] Filed: Nov. 5, 1997

[51] Int. Cl.[7] ....................................................... G06F 17/60
[52] U.S. Cl. ...................................... 705/7; 705/8; 705/35
[58] Field of Search .................................. 705/7, 8, 1, 35

[56] References Cited

PUBLICATIONS

Rushmeier et al, "Advances in the Optimization of Airline Fleet Assignment", Transportation Science, vol. 31, No. 2, May, 1997.
Pritsker, Alan A., Introduction to Simulation and SLAM II, Third Edition, Systems Publishing Corp., 1986.

*Primary Examiner*—Stephen R. Tkacs
*Assistant Examiner*—George D. Morgan
*Attorney, Agent, or Firm*—Finnegan, Henderson, Farabow, Garrett & Dunner, L.L.P.

[57] ABSTRACT

A comprehensive system and methodology for incorporating origination and destination network effects into a transportation industry's vehicle assignment process. The invention utilizes a decomposition strategy to combine a simplified version of network segment-FAM with the network flow aspects of origination and destination yield management. The invention's decomposition of the problem allows for the nonlinear aspects of the targeted origination and destination market effects to be isolated in origination and destination yield management, and subsequently incorporated in the vehicle assignment model using linear approximations to the total revenue function. The system operates either in "standalone" mode, or communicably attached to remote and local databases attendant to equipment and scheduling.

18 Claims, 11 Drawing Sheets

Microfiche Appendix Included
(1 Microfiche, 13 Pages)

TEN CITY TRANSPORTATION NETWORK ILLUSTRATION

ORGINATION AND DESTINATION FLEET ASSIGNMENT MODEL-
ILLUSTRATIVE DATA SUMMARY

| MODEL PARAMETER | VALUE |
|---|---|
| NUMBER OF STATIONS (CITIES) | 10 |
| NUMBER OF FLIGHT LEGS | 48 |
| O&D MARKET CLASSES | 534 |
| NUMBER OF HUB (DFW) COMPLEXES | 2 |
| FLEET TYPES | 2 |
| BOEING 757 | |
| CAPACITY | 200 |
| AVAILABLE AIRCRAFT | 7 |
| MD SUPER 80 | |
| CAPACITY (NO. OF PASSANGERS) | 150 |
| AVAILABLE AIRCRAFT | 8 |
| AVERAGE O&D DEMAND | |
| Y CLASS | 5 |
| M CLASS | 15 |
| Q CLASS | 25 |
| CV | 0.35 |

*FIG. 7*

EXAMPLE ITINERARY DEMANDS AND REVENUES

| ITINERARY | MEAN DEMAND | TICKET FARE ($) | ITINERARY | MEAN DEMAND | TICKET FARE ($) |
|---|---|---|---|---|---|
| ABQSATY0 | 4 | 210 | ABQBOSQ1 | 12.5 | 199 |
| ABQSATY1 | 4 | 210 | ABQORDQ0 | 12.5 | 107 |
| ABQAUSY0 | 4 | 203 | ABQORDQ1 | 12.5 | 107 |
| ABQAUSY1 | 4 | 203 | ABQSEAQ0 | 12.5 | 155 |
| ABQDFWY0 | 4 | 131 | ABQSEAQ1 | 12.5 | 155 |
| ABQDFWY1 | 4 | 131 | ABQSFOQ0 | 12.5 | 104 |
| ABQDCAY0 | 4 | 639 | ABQSFOQ1 | 12.5 | 104 |
| ABQDCAY1 | 4 | 639 | SATABQY0 | 4 | 207 |
| ABQJFKY0 | 4 | 396 | SATABQY1 | 4 | 207 |
| ABQJFKY1 | 4 | 396 | SATAUSY0 | 4 | 139 |
| ABQBOSY0 | 4 | 748 | SATAUSY1 | 4 | 139 |
| ABQBOSY1 | 4 | 748 | SATDFWY0 | 4 | 81 |
| ABQORDY0 | 4 | 290 | SATDFWY1 | 4 | 81 |
| ABQORDY1 | 4 | 290 | SATDCAY0 | 4 | 646 |
| ABQSEAY0 | 4 | 250 | SATDCAY1 | 4 | 646 |
| ABQSEAY1 | 4 | 250 | SATJFKY0 | 4 | 702 |
| ABQSFOY0 | 4 | 174 | SATJFKY1 | 4 | 702 |
| ABQSFOY1 | 4 | 174 | SATBOSY0 | 8 | 702 |
| ABQSATM0 | 7.5 | 135 | SATORDY0 | 4 | 290 |
| ABQSATM1 | 7.5 | 135 | SATORDY1 | 4 | 290 |
| ABQAUSM0 | 7.5 | 132 | SATSEAY0 | 8 | 275 |
| ABQAUSM1 | 7.5 | 132 | SATSFOY0 | 4 | 554 |
| ABQDFWM0 | 7.5 | 109 | SATSFOY1 | 4 | 554 |
| ABQDFWM1 | 7.5 | 109 | SATABQM0 | 7.5 | 183 |
| ABQDCAM0 | 7.5 | 275 | SATABQM1 | 7.5 | 183 |
| ABQDCAM1 | 7.5 | 275 | SATAUSM0 | 7.5 | 123 |
| ABQJFKM0 | 7.5 | 289 | SATAUSM1 | 7.5 | 123 |
| ABQJFKM1 | 7.5 | 289 | SATDFWM0 | 7.5 | 61 |
| ABQBOSM0 | 7.5 | 280 | SATDFWM1 | 7.5 | 61 |
| ABQBOSM1 | 7.5 | 280 | SATDCAM0 | 7.5 | 365 |
| ABQORDM0 | 7.5 | 183 | SATDCAM1 | 7.5 | 365 |
| ABQORDM1 | 7.5 | 183 | SATJFKM0 | 7.5 | 360 |
| ABQSEAM0 | 7.5 | 193 | SATJFKM1 | 7.5 | 360 |
| ABQSEAM1 | 7.5 | 193 | SATBOSM0 | 15 | 388 |
| ABQSFOM0 | 7.5 | 125 | SATORDM0 | 7.5 | 180 |
| ABQSFOM1 | 7.5 | 125 | SATORDM1 | 7.5 | 180 |
| ABQSATQ0 | 12.5 | 74 | SATSEAM0 | 15 | 206 |
| ABQSATQ1 | 12.5 | 74 | SATSFOM0 | 7.5 | 246 |
| ABQAUSQ0 | 12.5 | 59 | SATSFOM1 | 7.5 | 246 |
| ABQAUSQ1 | 12.5 | 59 | SATABQQ0 | 12.5 | 74 |
| ABQDFWQ0 | 12.5 | 83 | SATABQQ1 | 12.5 | 74 |
| ABQDFWQ1 | 12.5 | 83 | SATAUSQ0 | 12.5 | 79 |
| ABQDCAQ0 | 12.5 | 90 | SATAUSQ1 | 12.5 | 79 |
| ABQDCAQ1 | 12.5 | 90 | SATDFWQ0 | 12.5 | 43 |
| ABQJFKQ0 | 12.5 | 199 | | | |
| ABQJFKQ1 | 12.5 | 199 | | | |
| ABQBOSQ0 | 12.5 | 199 | | | |

FIG. 8

FINAL ASSIGNMENTS FOR LEG-FAM AND O&D FAM

| FLIGHT LEG | LEG-BASED FAM SOLUTION | | O&D FAM SOLUTION | |
|---|---|---|---|---|
| | EQUIPMENT | EXPECTED TRAFFIC | EQUIPMENT | EXPECTED TRAFFIC |
| ABCDFW1 | 757 | 165 | 757 | 16 |
| ABQDFW2 | 757 | 170 | 757 | 17 |
| AUSDFW1 | 757 | 163 | 757 | 16 |
| AUSDFW2 | 757 | 166 | 757 | 16 |
| BOSDCA1 | S80 | 38 | S80 | 3 |
| BOSDFW1 | S80 | 124 | S80 | 12 |
| BOSDFW2 | 757 | 153 | 757 | 14 |
| BOSORD1 | 757 | 34 | 757 | 3 |
| BOSSFO1 | S80 | 34 | S80 | 3 |
| DCABOS1 | S80 | 38 | S80 | 3 |
| DCADFW1 | 757 | 158 | 757 | 15 |
| DCADFW2 | 757 | 161 | 757 | 15 |
| DCAJFK1 | S80 | 34 | 757 | 3 |
| DFWABQ1 | 757 | 170 | 757 | 17 |
| DFWABQ2 | 757 | 148 | 757 | 14 |
| DFWAUS1 | 757 | 166 | 757 | 17 |
| DFWAUS2 | 757 | 145 | 757 | 14 |
| DFWBOS1 | 757 | 162 | 757 | 15 |
| DFWBOS2 | S80 | 97 | S80 | 9 |
| DFWDCA1 | 757 | 169 | 757 | 16 |
| DFWDCA2 | 757 | 119 | 757 | 11 |
| DFWJFK1 | 757 | 160 | 757 | 16 |
| DFWJFK2 | 757 | 137 | S80 | 11 |
| DFWORD1 | 757 | 167 | S80 | 13 |
| DFWORD2 | S80 | 124 | S80 | 12 |
| DFWSAT1 | 757 | 169 | 757 | 17 |
| DFWSAT2 | 757 | 149 | 757 | 14 |
| DFWSEA1 | S80 | 136 | S80 | 13 |
| DFWSEA2 | 757 | 153 | 757 | 15 |
| DFWSFO1 | S80 | 131 | S80 | 13 |
| DFWSFO2 | 757 | 145 | 757 | 14 |
| JFKDCA1 | S80 | 38 | 757 | 3 |
| JFKDFW1 | 757 | 153 | S80 | 12 |
| JFDFW2 | 757 | 158 | 757 | 15 |
| JFKSFO1 | S80 | 34 | S80 | 3 |
| ORDBOS1 | 757 | 63 | 757 | 6 |
| ORDDFW1 | 757 | 131 | 757 | 13 |
| ORDDFW2 | 757 | 155 | S80 | 13 |
| ORDSEA1 | S80 | 39 | S80 | 3 |
| SATDFW1 | 757 | 170 | 757 | 17 |
| SATDFW2 | 757 | 153 | 757 | 15 |
| SEADFW1 | 757 | 183 | 757 | 18 |
| SEADFW2 | S80 | 24 | S80 | 2 |
| SEAORD1 | S80 | 63 | 757 | 6 |
| SFOBOS1 | S80 | 34 | S80 | 3 |
| SFODFW1 | 757 | 178 | 757 | 17 |
| SFODFW2 | S80 | 53 | S80 | 5 |
| SFOJFK1 | S80 | 39 | S80 | 3 |

SYSTEM AND METHOD FOR INCORPORATING ORIGINATION AND DESTINATION EFFECTS INTO A VEHICLE ASSIGNMENT PROCESS

REFERENCE TO MICROFICHE APPENDIX

Reference is made to a computer program listing incorporated as a microfiche appendix. The total number of microfiche is one, and the total number of frames is 13.

TECHNICAL FIELD OF THE INVENTION

The present invention relates in general, to a computerized vehicle assignment apparatus and method including electronic data collection and processing, and in particular to, a comprehensive computer resident system and methodology to incorporate origination and destination network effects into a transportation industry vehicle assignment process.

BACKGROUND OF THE INVENTION

Optimization, i.e., the efficient utilization of assets used in the physical transport of persons and commodities presents an ongoing challenge to organizations involved in transportation services. The effective utilization of deployed assets, e.g., vehicles, is a major objective of any entity engaged in transportation services irrespective of whether the particular transport mode is via an airline, ships, railroad, bus line, trucking service or other form of vehicular transport. Thus, an important consideration in any transportation organization's asset utilization program is the process that assigns a given vehicle type to a particular route within an organization's fleet of vehicles within the routes or service network serviced by the organization. As used herein, the term "network" refers to geographic locations that are served and tied together via a route structure serviced by one or more of the above mentioned transportation means. Consequently, the goal of any vehicle assignment process is to provide the optimal allocation of assets, e.g., vehicle types within an organization's transportation fleet in order to service routes within the network, subject to operational constraints.

The most common form of vehicle or Fleet Assignment Model ("leg based FAM") uses simplifying assumptions relating to passenger/cargo demands, revenues and network flows in order to approximate the expected revenue for each leg of a transportation organization's network. A network leg is best understood as a non-stop service, or route between any two locations within the transportation organization's service network. While these simplifying assumptions provide a point estimate of the expected revenue for each leg in the network given various capacity options, a significant deficiency with this approach is that it does not accurately incorporate Origination and Destination ("O&D") passenger effects. Origination and Destination effects include the impact of transportation over multiple legs of the network. An effective vehicle assignment process should, therefore, account for origination and destination effects by acknowledging and allowing for multiple markets throughout the network, multiple classes of service within market classes and network interactions or impact precipitated by market competition for available space.

Prior attempts to develop an O&D-based FAM formulation combined an O&D passenger flow model and a leg-based FAM model into one mixed integer nonlinear model formulation. The model developed in this early attempt used a brute force computational approach to solve the mixed integer nonlinear model and required hours of mainframe processing time to find a first feasible solution. In order to solve the model, the nonlinear O&D revenue function for each leg in a network was approximated a priori using linear segments. This approach did not account for or anticipate the form of the O&D revenue function prior to solving the model. This drawback was, in turn, was exacerbated by yield management process dependence upon expected demand for each class of service available within the network, and the equipment or vehicle type assigned to each leg of an organization's network. Consequently, this approach proved impracticable for commercial applications.

Thus, there exists a need for a system and method to incorporate origination and destination network effects into a transportation industry vehicle assignment process.

SUMMARY OF THE INVENTION

The present invention provides a new and unique approach to incorporate O&D effects into the transportation industry vehicle assignment process by reconciling vehicle assignment and network flow using a linear approximation of total revenue. The system and method of the present invention provides for decomposition of the vehicle assignment problem into a linear vehicle assignment model and a nonlinear network flow model. The model iteratively solves a network flow model and a modified linear FAM formulation to develop a more accurate approximation of the total O&D revenue function to determine optimal transportation vehicle assignment. The results provided by the present invention clearly indicate that the invention's O&D FAM provides for a superior vehicle assignment process than that presently available to the transportation industry.

To improve the computational efficiency of the O&D FAM formulation, a Benders' decomposition approach was developed. Using this approach, the invention separates O&D capacity allocation from the vehicle assignment process. The O&D capacity allocation model is then solved to approximate the revenue function using piece-wise linear bounds for each leg within the network.

To best describe and illustrate the invention's O&D FAM approach, a 10 city, 48 leg airline network example consisting of 534 O&D service markets and two vehicles is presented below and the results compared to that obtained by using leg-based FAM formulations.

The first leg-based formulation utilizes a prorating scheme to approximate the expected revenues from each leg in the network. The second formulation simply uses the total revenue for each O&D market class to approximate the revenue for each leg. Results indicate the present invention's O&D FAM provides a significant improvement in expected profit over the results of prior leg-based FAM formulations. In addition, the O&D FAM process of the present invention is computationally efficient, solving the model on a personal computer in seconds of real time, using a commercially-available programming language such as AMPL.

The success of the method of the present invention is attributable in part to its approximation of the total revenue function as opposed to the leg-FAM use of point estimates of revenue for each leg. Irrespective of the sophistication used to estimate leg revenues, leg-FAM cannot completely capture the O&D effects of through traffic in a transportation industry network. As used herein, "through traffic" relates to a commodity or person's transport beyond the next immediate point of delivery within a service network. The method of the present invention overcomes this limitation, and by utilizing a convex combination formulation as an intermediate method for developing an accurate approximation of the revenue function, significantly reduces the computational effort previously required to provide efficient and timely vehicle assignments.

BRIEF DESCRIPTION OF THE DRAWINGS

Other aspects of the invention and its advantages may be appreciated with reference to the following detailed description taken in conjunction with the appended drawings in which:

FIG. 8 presents for illustrative purposes example itinerary demands and revenues utilized by the origination and destination vehicle assignment model;

DETAILED DESCRIPTION

Figure 1:
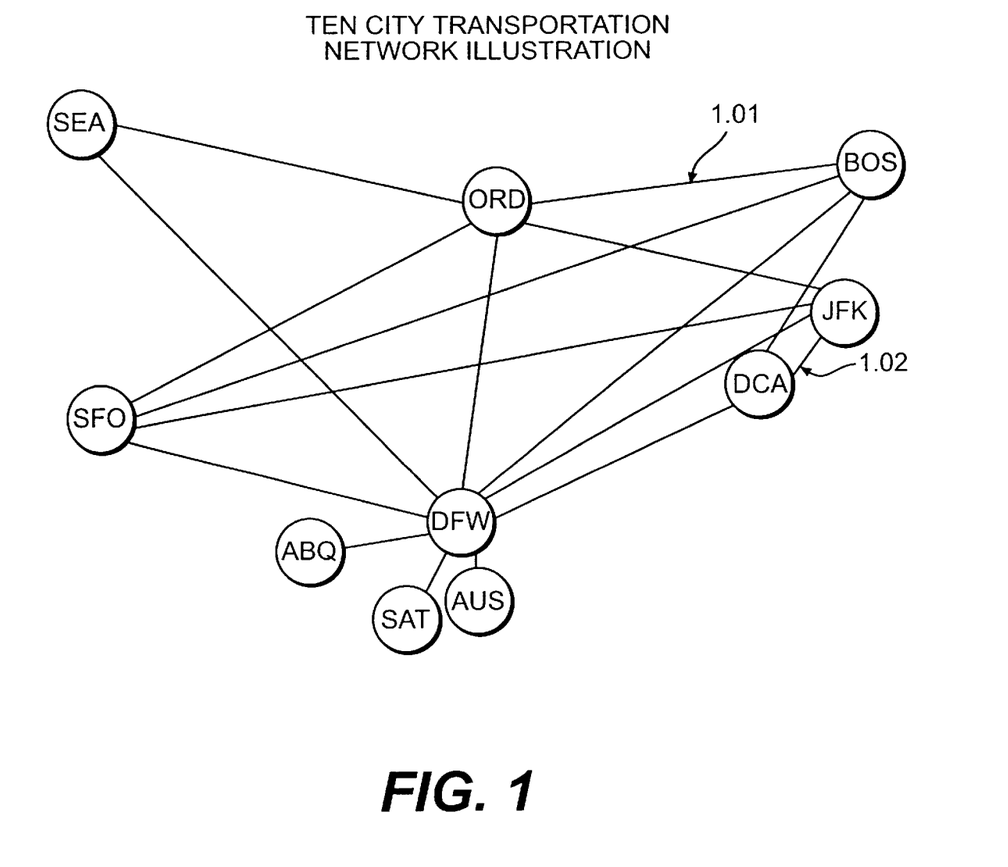
FIG. 1 is a representation, for descriptive purposes, of a Ten City Airline Network.

Referring now to FIG. 1, a ten city airline network is illustrated for the purposes of illustrating the invention. While equally applicable to other transportation modes and industries, the present invention is herein illustrated and disclosed in the context of airline vehicle assignments. As illustrated, FIG. 1 represents a group of cities comprising a hypothetical airline network. Examples of routes 1.01, 1.02, directly connecting cities in the network are shown and represent network legs or flight segments.

With reference to FIG. 1, a basic transportation vehicle assignment model preferably maximizes profit subject to three constraints: vehicle count; balance; and cover. The vehicle count constraint requires that, for each vehicle type, the number of vehicles, for example, airplanes used to transport people and commodities throughout the network, cannot exceed the total number of airplanes available. The balance constraint mandates that the number of vehicle arrivals must equal the number of departures for each city, time period and vehicle type. The cover constraint requires a vehicle type to be assigned to each leg in the network.

Mathematically, the general leg-based vehicle assignment model is expressed as a Leg-FAM Formulation:

$$\max P = \sum_{j=1}^{m} \sum_{j=1}^{n} (R_{ij} - C_{ij})x_{ij} \text{ (Objective: Maximize Profit)} \quad (1)$$

subject to:

$$\sum_{j \in Re(i,j)} x_{ij} + \sum_{s \in St(s,i)} G_{isT} \leq NP_i \quad \forall \, i \text{ (Plane Count)} \quad (2)$$

$$G_{ist-1}G_{ist} + \sum_{j \in IN(j,s,t)} x_{ij} - \sum_{j \in OUT(j,s,t)} x_{ij} = 0 \quad \forall \, i, s, t \quad (3)$$

(Balance)

$$\sum_{i=1}^{n} x_{ij} = 1 \quad \forall \, j \text{ (Cover)} \quad (4)$$

$$x_{ij} \in \begin{cases} 1 \text{ if aircraft type } i \text{ is assigned to schedule leg } j \\ 0 \text{ otherwise} \end{cases} \quad (5)$$

$$\forall \, i, j$$

$R_{ij}$ and $C_{ij}$ represent the average leg revenue and cost expected if vehicle type i is assigned to leg j, respectively. $G_{ist}$ represents a ground arc per vehicle type i departing station s at time t. Ground arcs allow aircraft to remain at a station for several time periods before departing to another station. The sets IN(j,s,t) and OUT(j,s,t) used in Equation 3 represent the set of all arcs arriving and departing from station s, respectively. The set Re(i,j) used in Equation 2 represents the set of late night flights that cross midnight. The set St(s,i) used in Equation 2 is the set of all ground arcs that cross midnight.

Equation 2 states that the number of planes of each vehicle type cannot exceed the total number of planes available. Equation 3 is the balance constraint stating that, at any station and time within a specified time period, the arrival of an aircraft must be matched by the departure of an aircraft. Aircraft can arrive at a station from another station or from the same station in the previous time period. Equation 4 is the cover constraint and stipulates that each flight leg must be assigned a vehicle type. Equation 5 defines the binary decision variable for assigning vehicle type i to flight leg j.

Figure 2:
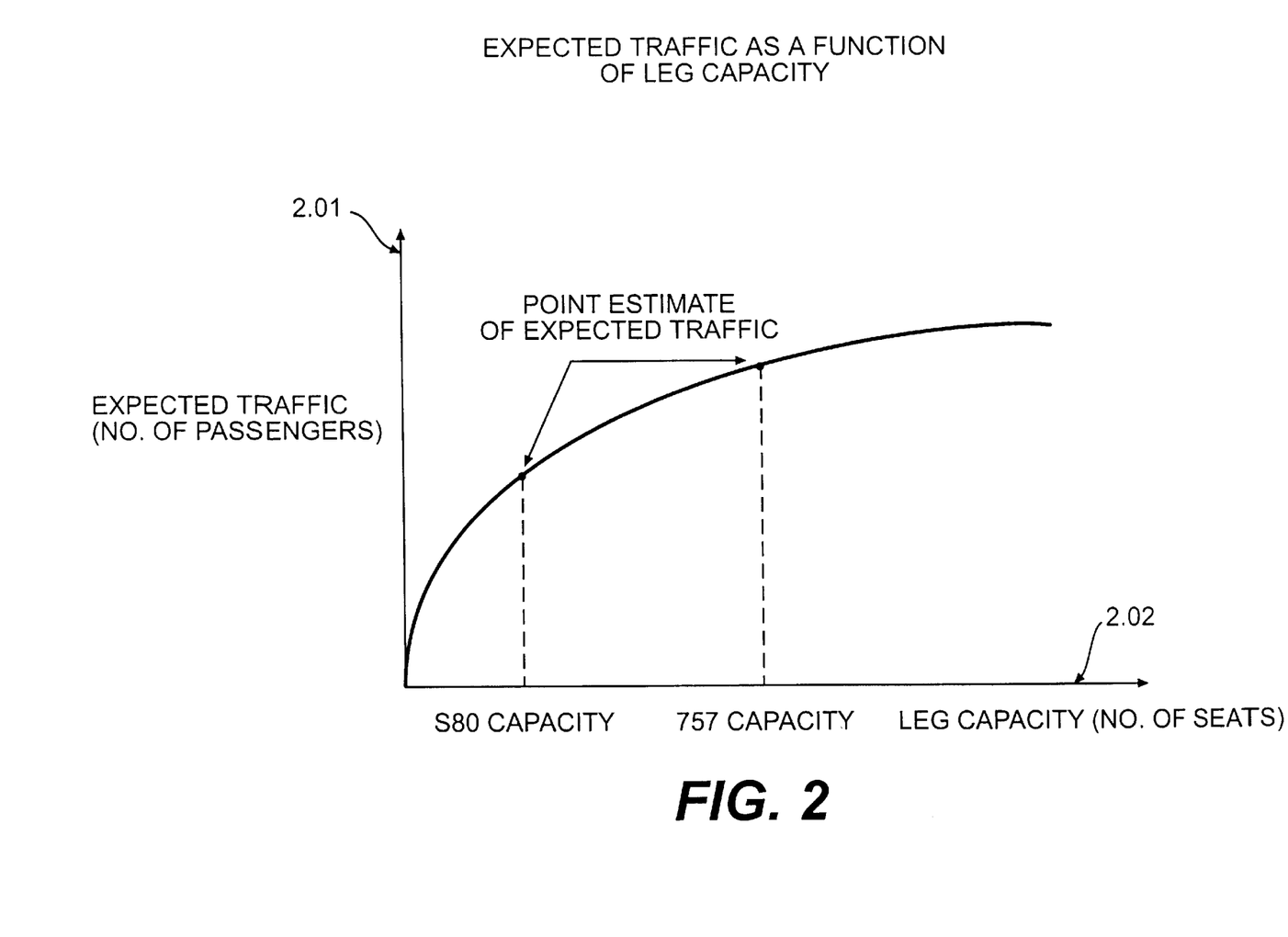
FIG. 2 is a graphical representation of expected traffic as a function of leg capacity.

One drawback with the foregoing approach is that neither O&D nor class effects are directly incorporated into the model. Referring now to FIG. 2, a graphical representation of expected traffic as a function of leg capacity, the only O&D effects used in this model involve estimating the expected traffic over each of network legs 2.01 as a function of leg capacity 2.02. This function is usually accomplished by applying a spill model to the total demand for each leg in the network. As the expected traffic for each leg 2.01 is estimated on a leg-by-leg basis, the model cannot capture the effects of network flow on the traffic of individual legs. Consequently, the model's prediction of the total revenue for each leg in the network reflects a point estimate of the revenue function. This process leads to an overestimate of the expected traffic and revenue for each leg in the network as it assumes unlimited capacity on every other leg in the network.

Figure 3:
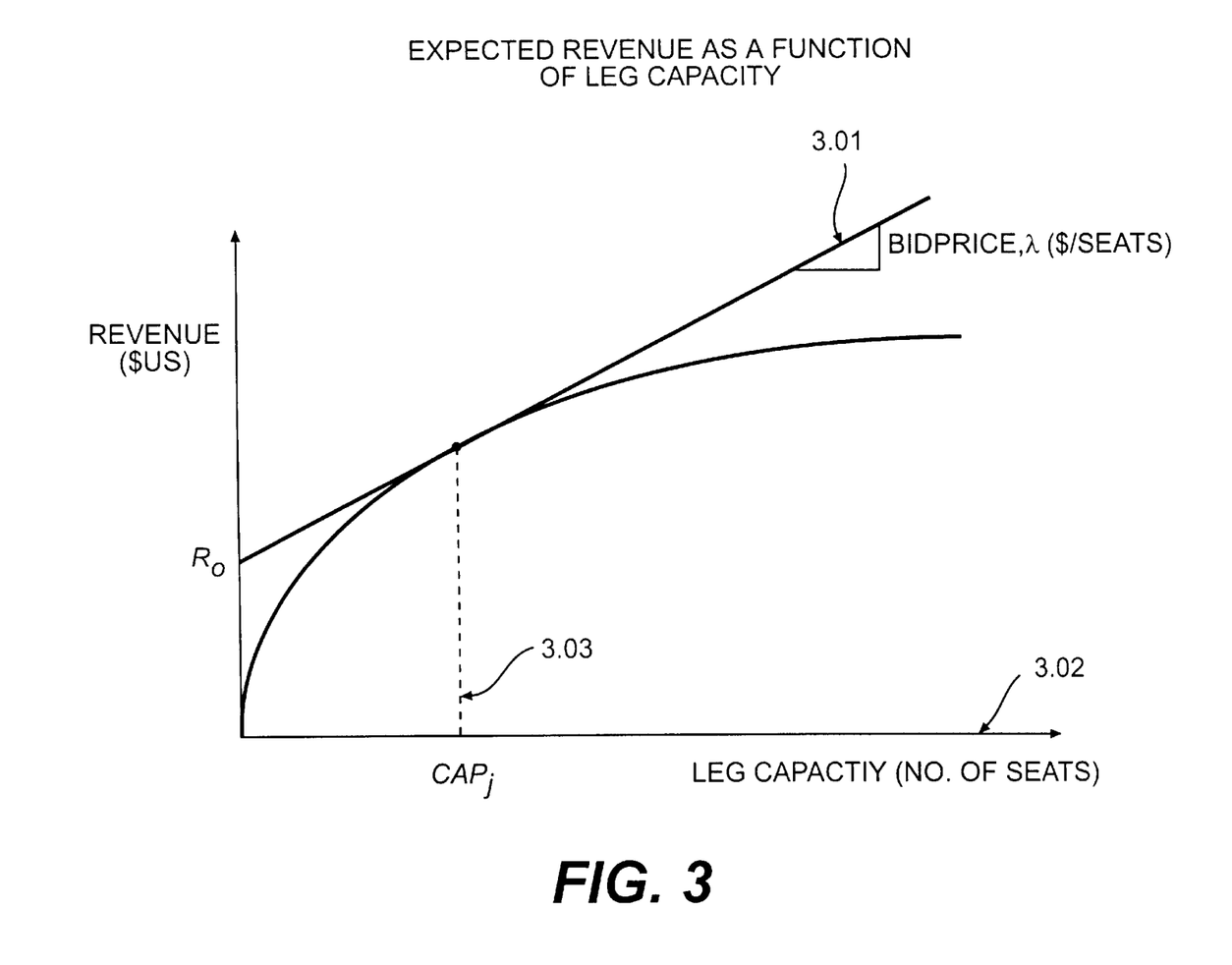
FIG. 3 is graphical representation of expected revenue as a function of leg capacity.

In reality, the revenue function depends upon the cumulative effect of all market classes flowing over leg j and incorporates the interaction between all legs in the network. The revenue function is actually a concave function with respect to leg capacity and is a result of O&D network flow. Turning now to FIG. 3 an illustrative example of the revenue function for a single leg in the network is presented.

Network flow or O&D yield management (O&D YM) solutions yield a set of prices bid for seats 3.01 (hereinafter referred to as bid price) for each leg, which represent the slope of the revenue function at a given leg capacity 3.02. This slope can be used to define a linear approximation and upper bound to the revenue function. Mathematically, this upper bound is expressed as:

$$R_{oj} + \lambda_j CAP_j \geq R(CAP_j)$$

where $R_{oj}$ represents "y-Axis" intercept of the linear approximation to the revenue function and $R(CAP_j)$ equals the total revenue as a function of the capacity of leg j. $\lambda_j$ is the marginal value of an extra seat on leg j, e.g. the bid price, and is a result of O&D yield management. Mathematically, the bid price for leg j is defined by:

$$\lambda_j = \frac{\partial R(CAP_j)}{\partial CAP_j} \quad (7)$$

where CAPj 3.02 is the capacity of the equipment assigned to leg j. For purposes of the present invention's disclosure, bid price represents the minimum acceptable price of a seat. It should be noted however that for other forms of commodity transportation the bid price would represent the minimum acceptable price for space required to transport such commodities. More importantly, the bid price represents the change in the total revenue due to a unit change in the capacity of leg j. Therefore, the bid price captures the cumulative effects of the market classes flowing over leg j and the interactions between leg j and the other legs in the network.

For any solution of FAM and a corresponding set of bid prices, the total revenue for the network is the sum of the revenues realized on each leg. Summing over all the legs in the network yields the following upper bound on the total revenue:

$$\sum_{j=1}^{m} R_{0_{jv}} + \sum_{j=1}^{m} \lambda_{jv} CAP_{jv} \geq R_{Total} \quad \forall v \quad (8)$$
$$(CR \text{ for all})$$

where v is the index for a specific FAM and YM solution. This relationship represents a Benders' cut and defines an overall upper bound on the total revenue for the network as a function of network flow results. Therefore, the overall revenue used in the O&D FAM of the present invention is defined by and a function of O&D network flow.

Equation 8 relates the vehicle assignment model to the network flow model. This relationship allows decomposition of O&D FAM into two separate but related problems: 1) a linear vehicle assignment model; and 2) a nonlinear network flow model. Separately, each of these models can be solved using conventional IP or NLP methods. Using the constraint defined by Equation 8, the general vehicle assignment model is modified to include O&D effects. The resulting linear vehicle assignment model used by O&D FAM is defined as:

Linear FAM Formulation $$\max P = R_{Total} - C_{Total} \text{ (Objective: Maximize Profit)} \quad (9)$$

subject to:

$$\sum_{j \in Re(i,j)} x_{ij} + \sum_{s \in Si(s,i)} G_{isT} \dot{z} NP_i \quad \forall i \text{ (Plane Count)} \quad (2)$$

$$G_{ist-1} - G_{ist} + \sum_{j \in IN(j,s,t)} x_{ij} - \sum_{j \in OUT(j,s,t)} x_{ij} = 0 \quad \forall i, s, t \quad (3)$$

(Balance)

$$\sum_{i=1}^{n} x_{ij} = 1 \quad \forall j \text{ (Cover)} \quad (4)$$

$$\sum_{i=1}^{m} R_{0_i} + \sum_{j=1}^{m} \lambda_j \left( \sum_{i=1}^{m} CAP_{ij} x_{ij} \right) - R_{Total} \geq 0 \text{ (Revenue)} \quad (10)$$

$$C_{Total} - \sum_{j=1}^{m} \sum_{i=1}^{n} C_{ij} x_{ij} = 0 \text{ (Cost)} \quad (11)$$

$$x_{ij} \in \begin{cases} 1 \text{ if aircraft type } i \text{ is assigned to schedule leg } j \\ 0 \text{ otherwise} \end{cases} \quad (5)$$

$$\forall i, j$$

For this formulation, the objective function is modified and two new constraints are added. Equation 10 is a modification of Equation 8 and allows for the incorporation of the original binary decision variable. Equation 11 simply redefines the total cost of the vehicle assignment as a constraint. O&D FAM explicitly incorporates network effects by utilizing the bid prices provided by solving an O&D network flow model to define the revenue function of FAM.

Conceptually, O&D FAM is very different than leg-based FAM. The revenue estimates for leg-based FAM are made on a leg-by-leg basis. Therefore, the revenue estimates and subsequent FAM formulation do not capture the network effects attributable to O&D yield management and passenger flow. Even using a nonlinear approximation to the revenue function for each leg in the network, leg-based FAM cannot accurately approximate the impact on passenger flow of up-line and down-line capacity constraints. On the other hand, O&D FAM incorporates the network effects directly into FAM through Equation 10. Equation 10 represents an upper bound on the total revenue for the network and provides a link between vehicle assignment and network flow. It is the function of the bid prices for all the legs within the network. As a result, the approximation is also a function of the O&D yield management effects throughout the network.

Figure 4:
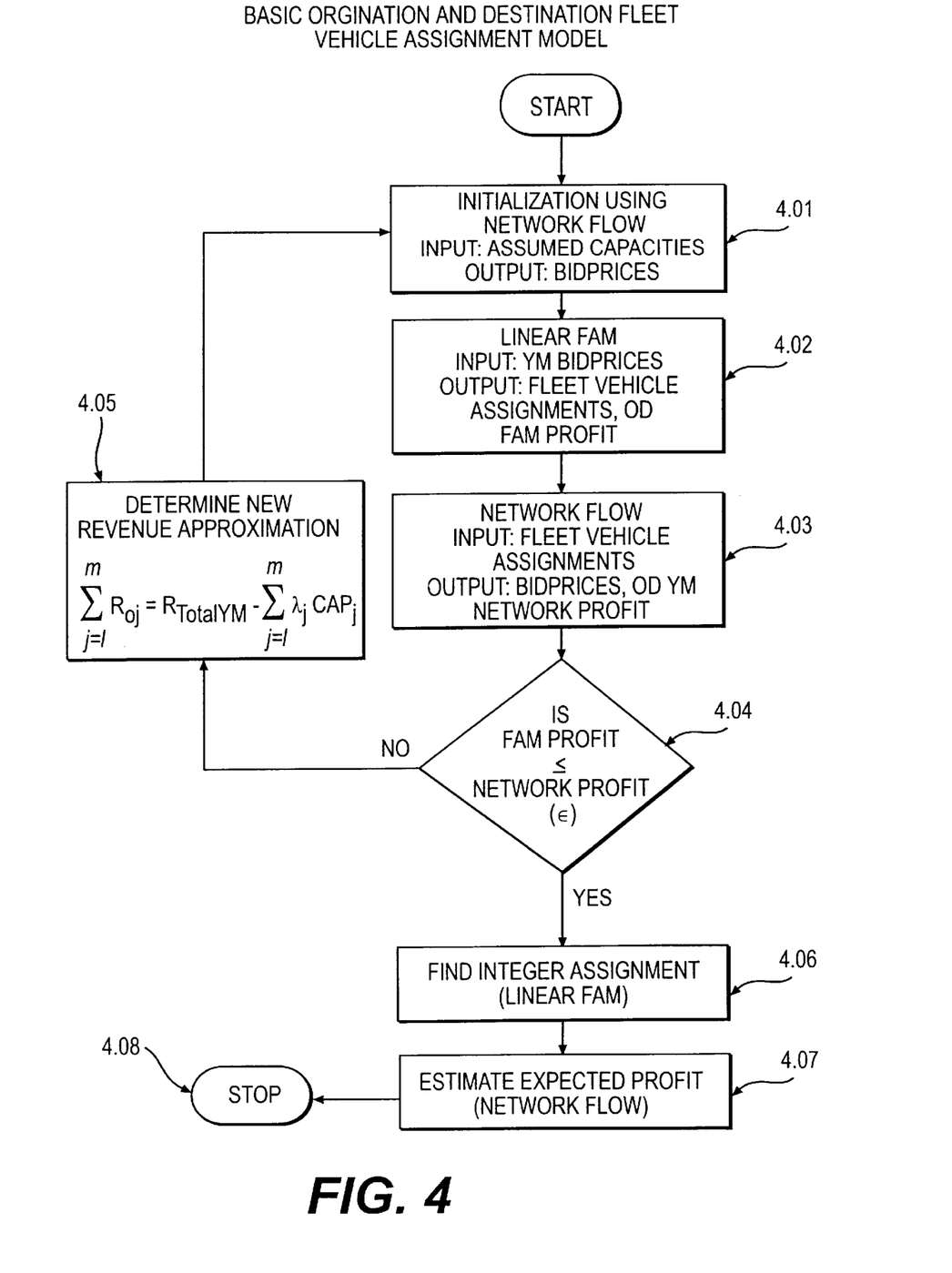
FIG. 4 is a logic flow depiction of the basic origination and destination vehicle assignment model.

To accurately implement O&D FAM, several network flow solutions corresponding to feasible vehicle assignments are needed. Referring now to FIG. 4, an iterative approach for solving the problem is depicted. Prior to initiating this iterative process, initial vehicle assignments or bid prices for each leg in the network are required. Such assignments or prices are obtained by: 1) assuming arbitrary initial capacities for each leg in the network and solving the network flow model or 2) assuming some initial bid prices and solving O&D FAM. Either option is acceptable and will not affect the final outcome of the iterative process. For descriptive purposes, initial capacities are assumed for each leg in the network to initiate the iterative process for solving the network flow model.

In step 4.01, the system is initialized based upon said assumed capacities in order to produce or generate a set of bid prices. In step 4.02, fleet vehicle assignments and origination and destination fleet assignment model profit is generated or produced based upon previously generated or produced bid prices 4.01. In step 4.03, bid prices and origination and destination yield management network profit are generated or produced based upon previously generated or produced fleet assignments 4.02. In step 4.04 previously generated or produced fleet assignment model profit 4.02 and network profit 4.03 are compared to determine if the difference is within an acceptable tolerance, $\epsilon$. If step 4.04 comparison results exceed the predetermined tolerance, a new revenue approximation is undertaken in step 4.05 and results thereof provided to step 4.02 as a revised basis for generating or producing fleet vehicle assignments and origination and destination fleet assignment model profit. In step 4.06 an appropriate integer assignment is located, if step 4.04 comparison of fleet assignment model profit and network prove to be within tolerance. In step 4.07, expected network flow profits are estimated and the system terminates processing in step 4.08.

O&D FAM avoids many of the problems inherent to leg-FAM. By using the results of the network flow model, O&D FAM provides a more realistic estimation of the total revenue function for the network. In addition, O&D FAM incorporates the impact of traffic flow in a manner that is consistent with revenue management practices. The O&D FAM approach uses a series of linear approximations based on the expected network traffic to determine a linear upper bound of the total revenue function instead of point estimates of the total expected revenue for each leg. This approach prevents the propagation of errors and possible inferior assignment of vehicle types due to inaccurate estimates of the revenues resulting from O&D traffic across each leg. Although the decision variables are defined as binary variables, it is computationally beneficial to relax this condition throughout the iterative portion of the solution process. This allows fractional solutions to be used in approximating the revenue function.

Figure 5:
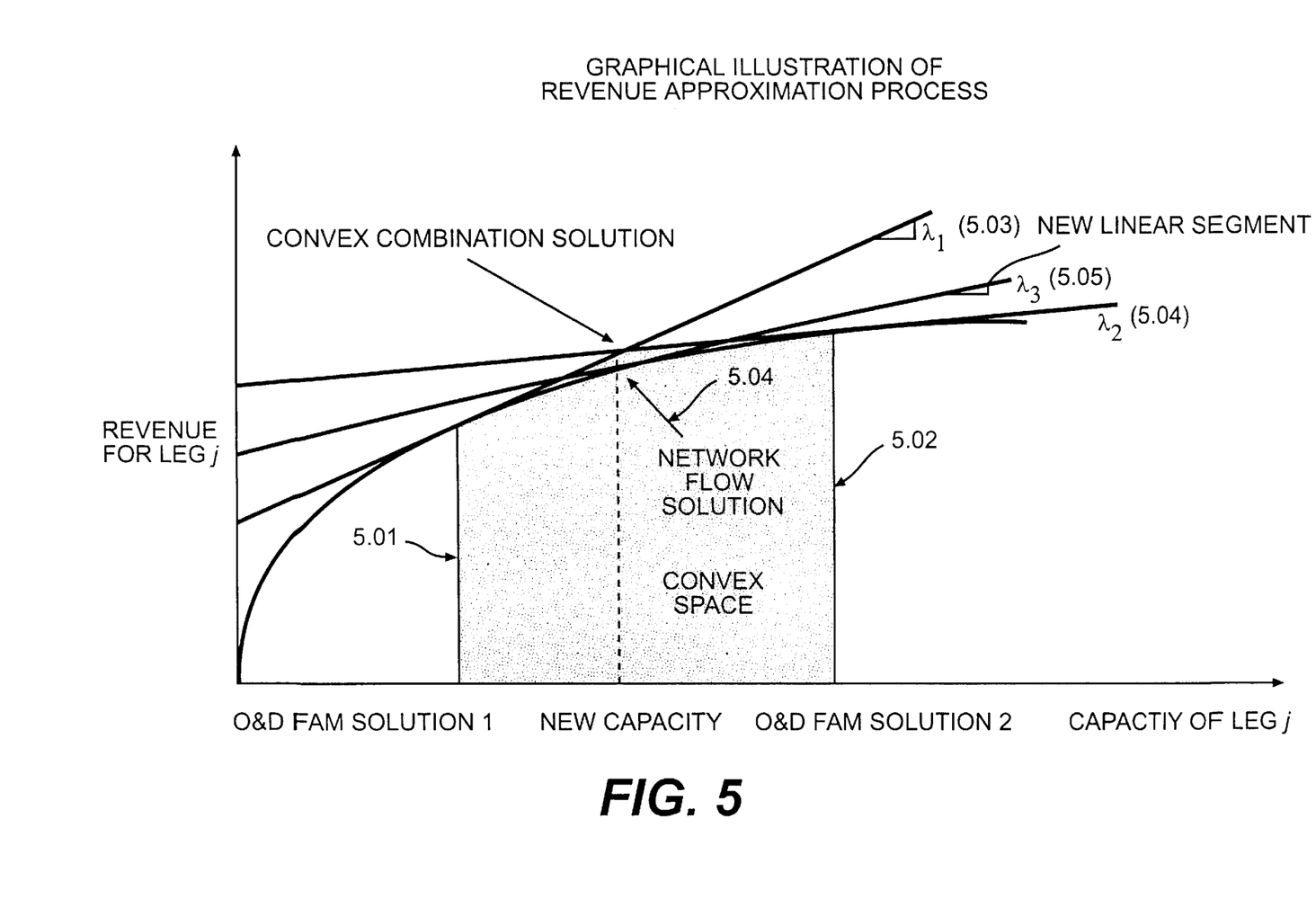
FIG. 5 is a graphical illustration of the revenue approximation process.

Although the iterative approach presented and described in FIG. 4 provides a more accurate estimation of the revenue and can result in a more efficient vehicle assignment, it does require multiple solutions to the vehicle assignment model. This problem is compounded by the fact that several linear approximations are needed to accurately model the revenue function. Furthermore, this form of modeling proves cumbersome. To avoid this problem, convex combinations can used to generate additional bid prices and linear approximations of the true revenue function. FIG. 5 presents a graphical illustration of this process for a single leg in the network.

Turning now to FIG. 5, it can be observed that solving O&D FAM twice yields an approximation of the revenue function consisting of two linear segments. These solutions are labeled O&D FAM Solution 1, 5.01 and O&D FAM Solution 2, 5.02 in FIG. 5. The capacities of these solutions are a result of solving O&D FAM while the corresponding bid prices ($\lambda_1$) 5.03 and ($\lambda_2$) 5.04 are a result of solving the network flow model. At this point, it is not necessary to solve the linear FAM model again to find a third linear approximation to the revenue function as the optimal capacity will be between and exclusive of, the two known O&D FAM solutions. For the illustrative example presented in FIG. 5 this corresponds to the intersection of the two linear segments.

FIG. 5 further reveals the optimal solution that exists between the two O&D FAM solutions results in an overestimation of the actual revenue. Therefore, using the new capacity, the network flow model is solved again resulting in a new bid price for the leg ($\lambda_3$) (5.05). The new bid price and its corresponding capacity are used to define a third linear segment approximating the revenue function.

Because the two O&D FAM solutions define the convex space denoted by the shaded area in FIG. 5, the optimal capacity is at an extreme point between the two solutions. As the solution space is convex, any combination of two or more feasible solutions to O&D FAM serves as a feasible solution to the assignment model. Hence, vehicle count, balance and cover constraints are satisfied implicitly and do not need to be included in the convex combination formulation. The mathematical formulation needed to determine convex combination solutions is simpler than the original prior FAM formulation. Mathematically, the convex combination model is defined by:

Convex Combination Formulation:

$$\max P = R_{Total} - C_{Total} \text{ (Objective: Maximize Profit)} \quad (9)$$

subject to:

$$\sum_{j=1}^{m} R_{0_j} + \sum_{j=1}^{m} \lambda_j \left( \sum_{i=1}^{m} CAP_{ij} x_{ij} \right) - R_{Total} \geq 0 \text{ (Revenue)} \quad (10)$$

$$C_{Total} - \sum_{j=1}^{m} \sum_{i=1}^{n} C_{ij} x_{ij} = 0 \text{ (Cost)} \quad (11)$$

$$x_{ij} - \sum_{k \in Fsol} \hat{x}_{ijk} \theta_k = 0 \ \forall i, j \text{ (Convex Combination 1)} \quad (12)$$

$$\sum_{k \in Fsol} \theta_k = 1 \text{ (Convex Combination 2)} \quad (13)$$

$$0 \leq \theta_k \leq \theta_{\max} \ \forall k \text{ (Limit on } \theta_k) \quad (14)$$

$$0 \leq x_{ij} \leq 1 \ \forall i, j \quad (15)$$

Equations 12 and 13 force the solution to be a combination of the adjacent O&D FAM solutions. Equation 14 forces the model to exclude the O&D FAM solution that represents the true maximum from the decision space. This constraint is necessary because the revenue function is always increasing with diminishing returns. Without Equation 14, the solution labeled O&D FAM solution 2 would be chosen as the optimal solution. Equation 15 simply relaxes the binary restriction on the decision variable. The set $F_{sol}$ used in Equations 12 and 13 represents all the existing O&D FAM solutions.

The convex combination formulation focuses on finding a set of capacities that lie between two or more existing O&D FAM solutions. The objective is to maximize the overall profit subject to the bounds defined by the linear approximations of the revenue function. Ignoring the balance, cover and plane count constraints (Equations 2, 3 and 4) in the FAM formulation allows efficient generation of more linear segments using new bid prices to represent the concave revenue function without solving the full vehicle assignment model. Therefore, a substantial amount of computational effort can be avoided by using the convex combination formulation to approximate the revenue function. Once a sufficient number of approximations to the revenue function have been made, O&D FAM can be solved again to determine an additional feasible vehicle assignment. This solution is then used as a basis for additional convex combination solutions to further define the revenue function.

The advantage of the system and method of the present invention results from the reduced computational resources required to solve the network model. If the time required to solve the network flow model is excessive, the approach will be computationally infeasible due to the required processing capability. However, the present invention reduces the time and processing requirements necessary to solve the network flow model compared to a conventional FAM.

In accordance with the present invention, the use of the convex combination formulation in the solution process, e.g., the iterative process described in FIG. 4 is modified. Once two O&D FAM solutions have been found, the convex combination formulation is solved. The process is repeated until the approximation of the revenue function is reasonably good. At this point, the O&D FAM model is solved again to find an additional vehicle assignment. Using the three O&D FAM solutions, the process of approximating the revenue function is repeated. The process is repeated until the O&D FAM profit and network flow profit converge. Once the two values have converged, the binary restriction on the decision variable is reinstated and O&D FAM is forced to an integer solution. The resulting capacities are then used by the network flow model to determine the true revenue.

Figure 6:
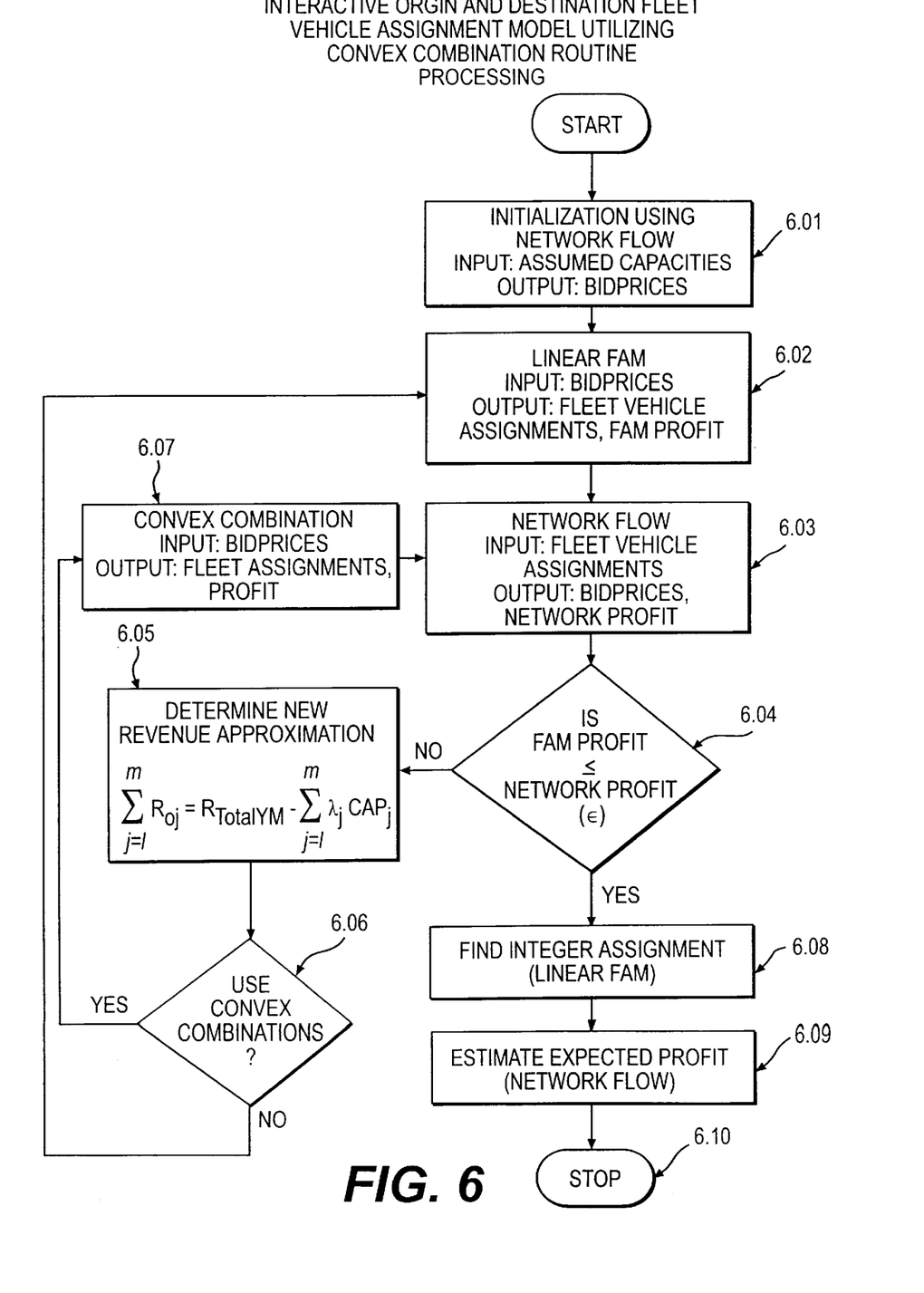
FIG. 6 is logic flow diagram depicting the iterative origin and destination vehicle assignment model utilizing convex combination routine processing.

Turning now to FIG. 6 a logic flow diagram for the modified process incorporating the use of the convex combination routine is presented. As illustrated, in step 6.01, the system is initialized based upon said assumed capacities in order to produce or generate a set of bid prices. In step 6.02, fleet vehicle assignments and fleet assignment model profit is generated or produced based upon previously generated or produced bid prices 6.01. In step 6.03, bid prices and network profit are generated or produced based upon previously generated or produced fleet assignments 6.02. In step 6.04 previously generated or produced fleet assignment model profit 6.02 and network profit 6.03 are compared to determine if the differne is within acceptable tolerance. If step 6.04 comparison results are out of tolerance, or outside of predetermined limits, a new revenue approximation is undertaken in step 6.05. In step 6.06, the system determines if two origination and destination fleet assignment model solutions have been determined. If the system has determined two origination and destination fleet assignments model solutions have been found, the system executes the convex combination formulation depicted in step 6.07, determining fleet vehicle assignments and profit based upon previously produced or generated bid prices, with the resulting fleet assignments provided to step 6.03 as a revised basis for generating or producing bid prices and network profit. If the system has determined two origination and destination fleet assignments model solutions have not been found in step 6.06, fleet assignments and fleet assignment model profit are again determined or produced based upon bid prices as indicated in step 6.02. In step 6.08 an appropriate integer assignment is located, if step 6.04 comparison of fleet assignment model profit and network prove equal or within predefined limits. In step 6.09, expected network flow profits are estimated and the system terminates processing in step 6.10.

Source code embodying a method of the present invention may be found in the microfiche appendix.

The present invention can be further clarified and appreciated by again referring to FIG. 1, the illustrative Purpose Ten City Airline Transportation Network. The network example illustrated in FIG. 1 consists of 48 flight legs, 534 O&D market classes and two vehicle types. In addition to direct flights to and from Dallas Fort Worth International airport ("DFW"), the network includes more network multiple flights per day. Market class prices shown in the following illustrative example are presented merely for the purpose of example. Typical market class demands are assumed.

The network flow model determines the optimal network traffic and bid prices using an approach similar to the O&D yield management model. Standard deviations for determining traffic and seat allocation for each market class are calculated using a constant coefficient of variation (CV). Traffic and demand are modeled using a Gamma distribution.

Figure 7:
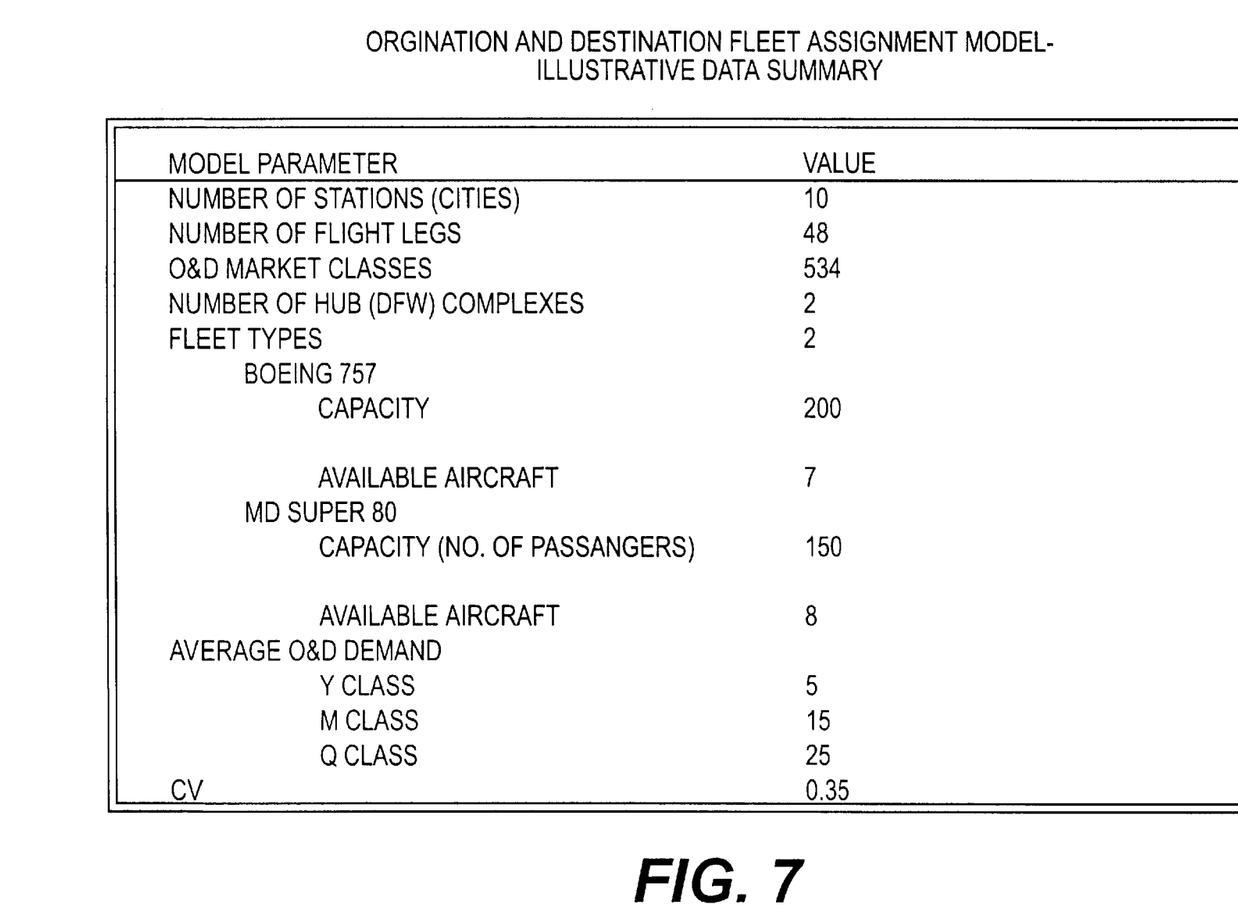
FIG. 7 represents origin and destination vehicle assignment data utilized in model formulation and solution.

Turning now to FIG. 7 an exemplary summary of the data used to formulate and solve the O&D FAM model is presented. A complete listing of the itinerary demands and revenues used in this example is herein provided is illustrated in FIG. 8. In order to provide a comparison with O&D FAM, leg-FAM must be solved using average or estimated leg-based revenues and costs. Thus, for the purpose of this example, two common approaches are used to estimate the leg revenues. In the first case, expected revenue is estimated by prorating the average fare paid by a customer. In the second case, revenues are estimated by averaging the total revenue paid by a customer.

Table 1 compares the results from solving the 10 city example using O&D FAM with results obtained using Leg-FAM. The results presented in Table 1 represent expected profit. For the results presented in Table 1, the Leg-FAM formulation used prorated leg revenues. The prorated revenues used in this case were proportional to the block times for each leg in the itinerary.

TABLE 1

Results for Prorated Revenue Case

| | Leg- FAM | | O & D FAM | |
|---|---|---|---|---|
| | Obj. | | | |
| | Function Value | Expected Value | Obj. Function Value | Expected Value |
| (1) | (2) | (3) | (4) | (5) |
| Continuous Solution | $55,202 | $66,080 | $69,886 | — |
| Integer | $55,202 | $66,080 | $69,519 | $67,954 |

Column 2 of Table 1 represents the expected profit from Leg-FAM. For this example, the initial Leg-FAM solution was integer and no branch and bound considerations were necessary. To estimate the total expected profit on an O&D level, the leg-FAM solution was used as input to the network flow model. The network flow model estimated the optimal traffic and revenue by allocating space to competing O&D fare classes. Column 3 represents the total expected O&D profit using the vehicle assignments from leg-FAM.

Column 4 presents the objective function value for the O&D FAM solution. The first entry in this column represents the continuous solution for O&D FAM and is a result of the iterative algorithm shown in FIG. 6. The second entry represents the expected profit when the O&D FAM model is advanced to an integer solution subject to the Benders' approximations of the revenue function. As indicated, when additional constraints are applied, the total revenue decreases. The figures in Column 5 represent the expected profit found by solving the network flow model for the final integer assignments from O&D FAM. As a graphic representation of Expected Traffic as a Function of Leg Capacity a graphic representation of Expected Traffic as a Function of Leg Capacity. As shown results from O&D FAM show a 2.8% improvement in total expected profit over the leg-FAM solution.

Figure 9:
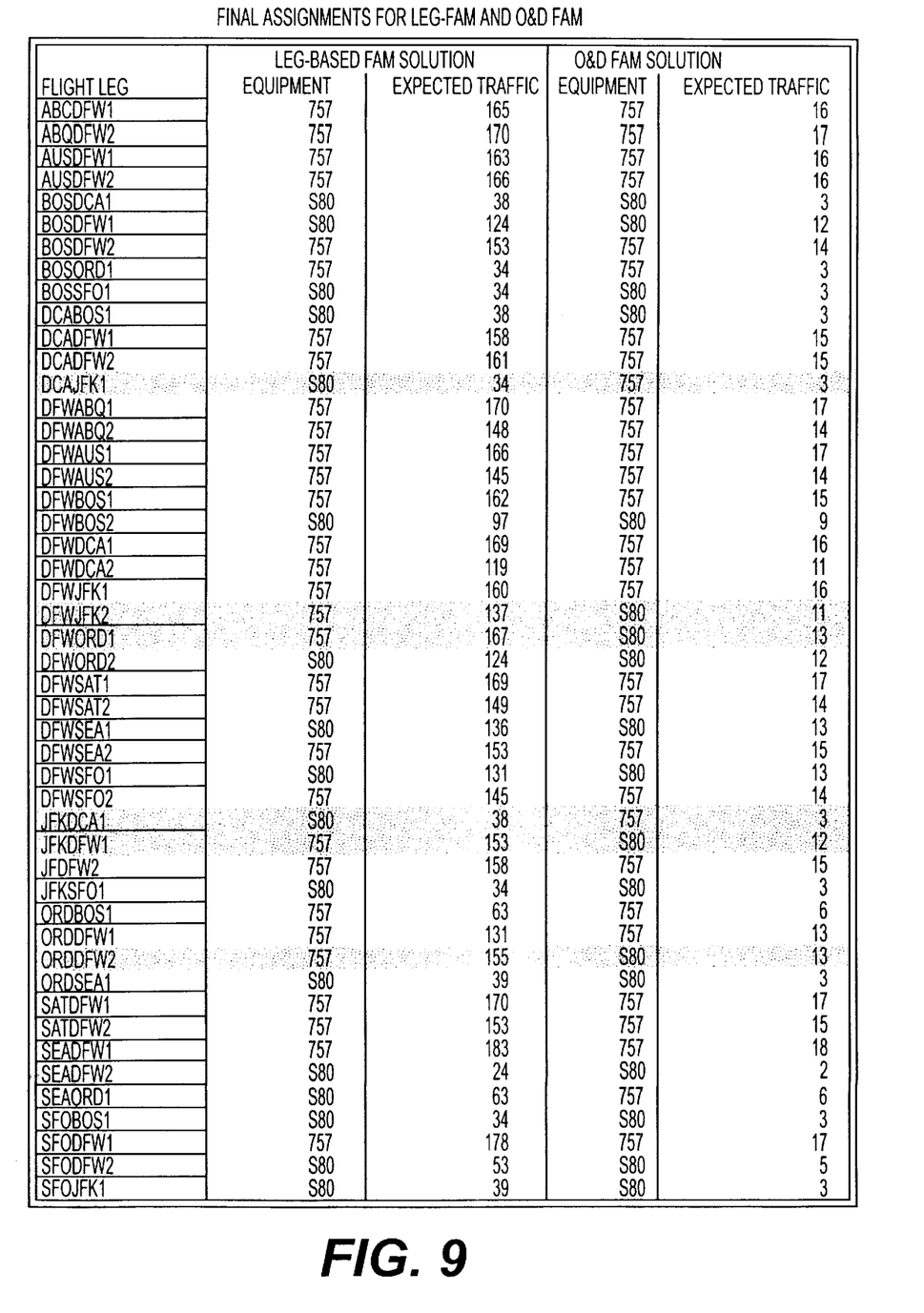
FIG. 9 presents for illustrative purposes a comparison of leg-vehicle assignment and origination and destination vehicle assignment model Solutions.

Referring now to FIG. 9, a representation of the final vehicle assignments and expected traffic for the O&D FAM and Leg-FAM solutions is presented. The average overall network load factor for these results are 66.9% for the leg-FAM solution and 66.2% for the O&D FAM solution. The shaded rows in FIG. 9 delineate those vehicle assignments that differ between the two solutions.

The results presented in Table 1 clearly illustrate that O&D FAM produces superior vehicle assignments. However, to clearly understand the fundamental differences between the leg-FAM and O&D FAM solutions, it is necessary to examine the system at the leg level. Table 2 presents specific details of a leg in which optimal aircraft assignment differs based upon application of the two different methods. Table 2 also provides details concerning the expected revenue used as input for the Leg-FAM formulation.

Table 2 compares the results for the JFK-DFW1 leg of the network. For this example, leg-FAM assigned a Boeing 757 and O&D FAM assigned a S80 to the flight leg. This particular flight leg serves approximately 27 individual market classes, i.e pricing structures, and for the purpose of this example is assumed to have a total leg demand of 179.5 passengers. Columns 2 and 3 of Table 2 present the expected traffic, revenues and profit figures for use as input to Leg-FAM. The traffic values presented in Columns 2 and 3 are determined using a normally distributed spill model with a coefficient of variation (CV) of 0.35. The revenue per passenger represents a weighted average based on demand of the prorated leg revenues for each market class traveling on the leg. The leg cost is the cost of flying the leg and is based on the block times for the individual flight leg. As used herein, "block time" refers to the time interval between an aircraft leaving one terminal location and arriving at another. When applied to other transportation industries, block time can be equated to elapsed transportation time between origination and destination points in an organization's service network.

Column 4 presents the actual estimated traffic, revenues and profit figures for the final O&D FAM solution. Column 5 presents the actual estimated traffic, revenues and profit figures for the final Leg-FAM solution. For columns 4 and 5, the average revenue per passenger is defined as the quotient of the total expected revenue and the expected traffic.

TABLE 2

Solution Comparison for Flight Leg JFK-DFW1
Total Leg Demand = 179.5

|   | Leg-FAM Inputs | | Network Solution (O & D FAM) | Network Solution (Leg-FAM) |
|---|---|---|---|---|
|   | S80 | 757 | S80 | 757 |
| (1) | (2) | (3) | (4) | (5) |
| Traffic | 138.9 | 165.4 | 122.6 | 153 |
| Revenue per (passenger) | $152.55 | $152.55 | $193.83 | $166.99 |
| Load Factor | 0.93 | 0.83 | 0.82 | 0.77 |
| E(Revenue) | $21,186 | $25,232 | $23,764 | $25,550 |
| Leg Cost | $11,961 | $14,220 | $11,961 | $14,220 |
| E(Profit) | $9,226 | $11,012 | $11,803 | $11,330 |

The results presented in Table 2 above illustrate the advantages of the present invention's O&D FAM over Leg-FAM solutions. First, leg-FAM consistently underestimates the average revenue per passenger. Second, leg-FAM overestimates the total expected traffic resulting in a load factor that is too high. These differences are due to the fact that leg-FAM uses a weighted average revenue based on total leg demand to estimate the total revenues for each leg. No consideration is given to the availablity of seats to different O&D market fare classes. In essence, using total demand to estimate the traffic assumes that all the passengers are alike and have the same chance of obtaining a seat. In reality, seats are allocated based on price, expected demand and overall revenue. The network flow model reduces leg traffic and increases the average revenue per passenger by discriminating between the individual O&D market classes bidding for space on a flight leg. The total revenue received for a network is a function of the individual fares and actual traffic for each O&D market class throughout the network.

Table 3 below is provided to present comparative results for a second leg in the example network:

TABLE 3

Solution Comparison for Flight Leg ORDDFW2
Total Leg Demand = 168

|   | Leg-FAM Inputs | | Network Solution (O & D FAM) | Network Solution (Leg-FAM) |
|---|---|---|---|---|
|   | S80 | 757 | S80 | 757 |
| (1) | (2) | (3) | (4) | (5) |
| Traffic | 135.7 | 158.3 | 130.3 | 155.3 |
| Revenue per (passenger) | $77.23 | $77.23 | $83.97 | $78.05 |
| Load Factor | 0.90 | 0.79 | 0.87 | 0.78 |
| E(Revenue) | $10,479 | $12,222 | $10,945 | $12,123 |
| Leg Cost | $9,303 | $11,060 | $9,303 | $11,060 |
| E(Profit) | $1,176 | $1,162 | $1,642 | $1,063 |

To fully appreciate the benefits of the present invention's O&D FAM, the results are herein compared to a leg-FAM solution in which total O&D revenue is used to estimate the leg revenue. Table 4 compares the results from solving the ten city example provided as FIG. 1 using O&D FAM with results obtained using leg-FAM. As before, the results presented represent profits. For the results set forth herein, the leg-FAM formulation used average total itinerary revenues to estimate the expected revenue for each leg in the network. The average itinerary revenues used in this case were weighted proportional to the itinerary demand. The expected revenue for each leg represents the product of the expected traffic and the average total itinerary fare paid by an individual traveling on the leg. As in the prorated case, the initial solution to Leg-FAM was all integer.

TABLE 4

Results for Total Revenue Case

|   | Leg- FAM | | O & D FAM | |
|---|---|---|---|---|
|   | Obj. Function Value | Expected Value | Obj. Function Value | Expected Value |
| (1) | (2) | (3) | (4) | (5) |
| Continuous Solution | $55,202 | $66,080 | $69,886 | — |
| Integer | $55,202 | $66,080 | $69,519 | $67,954 |

Figure 10:
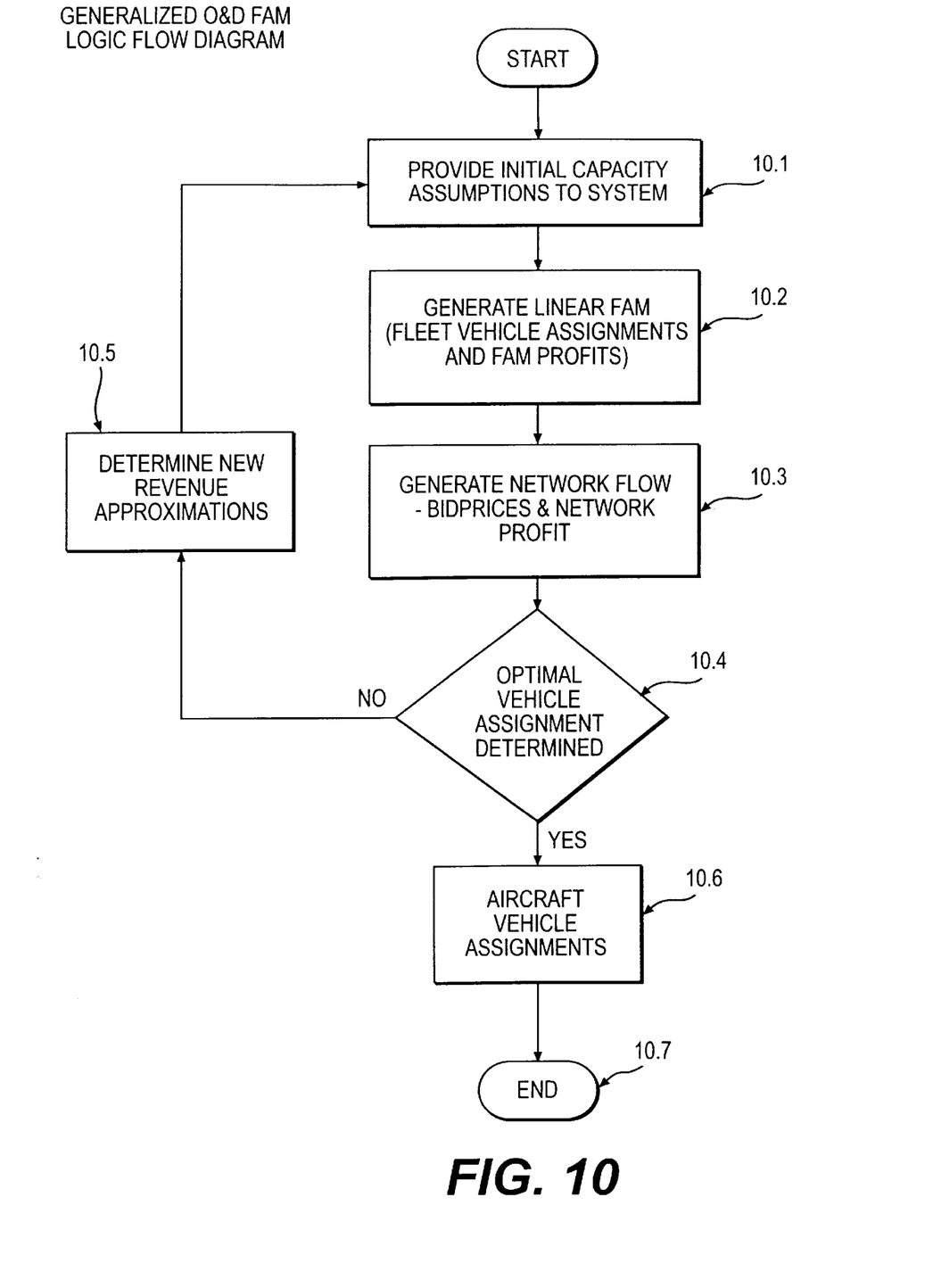
FIG. 10 is a simplified logic flow diagram illustrating the primary processing components of the origination and destination network effects of the vehicle assignment method of the present invention.

Referring now to FIG. 10 there is presented a simplified logic flow diagram illustrating the primary processing components of the Origination and Destination Network Effects Vehicle Assignment system. As illustrated, the user first initializes the system in step 10.1 by providing initial capacity assumptions. Next, the system generates a fleet vehicle and assignment model in step 10.2. Having produced the linear FAM in step 10.2, the system next develops or generates network profit in step 10.3. Network profit is then compared to FAM profit in step 10.4 to determine if optimal fleet vehicle assignment has been achieved. If optimal vehicle assignment has not been achieved, the system next determines revised revenue approximations in step 10.5 and passes that information to step 10.2 in which the system again develops or generates a fleet assignment model profit. If an optimal fleet vehicle assignment has been determined in step 10.4, aircraft assignments are finalized in step 10.6 and the system terminates processing in step 10.7.

Figure 11:
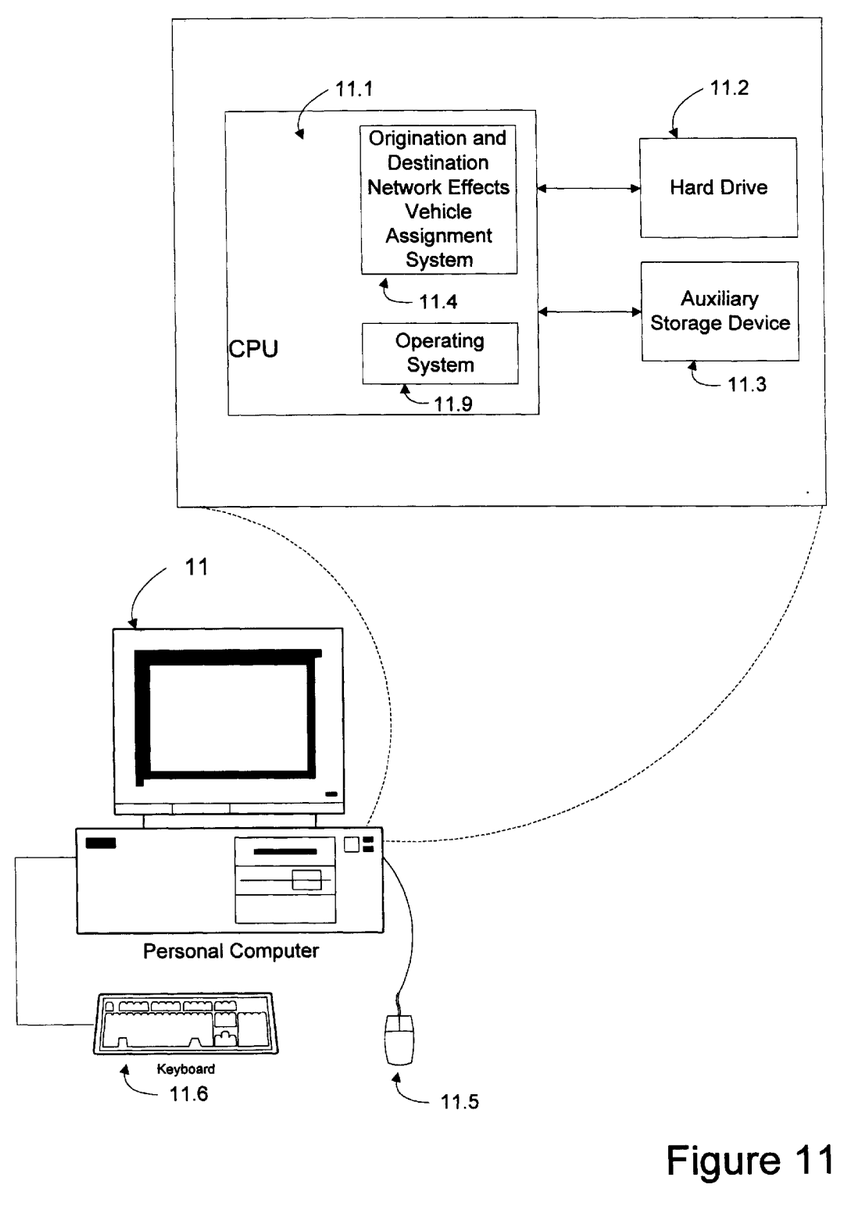
FIG. 11 is a schematic representation of communicably linked hardware components for implementing the the origination and destination fleet assignment method of the present invention.

As previously noted, execution of the Origination and Destination Network Effects Vehicle Assignment System may be accomplished via personal computer or, for example, a unix-based workstation. A schematic representation of communicably linked hardware components associated is herein provided as FIG. 11. Having been loaded into a personal computer's central processing unit 11.1 from the personal computer's hard drive 11.2 or auxiliary storage device 11.3, the user communicates with the Origination and Destination Network Effects Vehicle Assignment System 11.4 via personal computer keyboard 11.6 and pointing and selection device 11.5. The Origination and Destination Network Effects Vehicle Assignment System 11.4, operating under dispatching control of the personal computer's operating system (11.9) allows for interaction with the user via a programmable Graphic User Interface.

While this invention has been described in reference to illustrative embodiments, this description is not to be construed in a limiting sense. Various modifications and combinations of the illustrative embodiments as well as other embodiments to the invention will be apparent to those persons skilled in the art upon reference to this disclosure. It is therefore intended that the claims encompass any such modifications or embodiments.

We claim:

1. A system for determining the allocation of resources in a transportation industry comprising:
    a computer having access to a storage device, the storage device including a data base incorporating the identity, number and capacity of different vehicles available for transportation over a transportation industry's service network including a plurality of predetermined routes;
    the storage device further including instructions for allocating a vehicle to one or more predetermined routes based upon combined origination and destination and individual route effects of the vehicle assignment, the instruction using a series of linear approximations;
    a computer output device communicably attached to said system; and
    a computer input device communicably attached to said system.

2. The system in accordance with claim 1 where the computer output capability is a computer printer.

3. The system in accordance with claim 1 where the computer output capability is a computer monitor.

4. The system in accordance with claim 1 where the computer input device is a computer keyboard.

5. The system in accordance with claim 1 where the computer input device is a computer mouse.

6. The system in accordance with claim 1 where the computer, computer storage device, computer output capability and computer input capability are communicably linked via a local area network.

7. A method for vehicle assignment incorporating origination and destination effects comprising the steps, performed by a processor, of:
    (1) initializing a fleet vehicle assignment model based upon assumed vehicle capacities;
    (2) generating fleet vehicle assignments and origination and destination fleet assignment model profit predictions from step 1;
    (3) generating origination and destination yield management network profit prediction and bid prices based upon fleet vehicle assignments;
    (4) comparing results of generated origination and destination fleet assignment model profit prediction to previously generated or produced origination and destination network profit prediction; and
    (5) generating a revenue approximation if previously generated or produced origination and destination fleet assignment model profit prediction and previously generated or produced origination and destination network profit prediction results are outside of a predetermined range.

8. The method in accordance with claim 7 further comprising the step of determining if two previous origin and destination fleet vehicle assignment model solutions have been found after generating a revised bid price approximation.

9. The method in accordance with claim 7 wherein fleet vehicle assignments and origination and destination fleet assignment model predictions are generated based upon determining previous origin and destination fleet assignment model solutions.

10. The method in accordance with claim 9 wherein fleet vehicle assignment and origination and destination profit prediction is generated based upon having determined two origin and destination fleet vehicle assignment model solutions.

11. The method of claim 7 wherein the fleet assignment model comprises an aircraft assignment model.

12. The method of claim 7 further comprising the step of initializing a fleet vehicle assignment model with bid prices based upon assumed vehicle capacities.

13. The method of claim 7 further comprising the step of initializing generating fleet vehicle assignments and origination and destination fleet assignment model profit predictions based upon bid prices.

14. The method of claim 7 further comprising the step of assigning vehicles to network routes based upon the estimated expected network profit.

15. The method of claim 7 wherein the method is implemented on a computer.

16. The method of claim 7 wherein the method is implemented on a computer, computer storage device, computer output device and computer input device communicably linked via a local area network.

17. A method for vehicle assignment incorporating origination and destination effects comprising the steps, performed by a processor, of:
    (1) initializing a fleet vehicle assignment model based upon assumed vehicle capacities;
    (2) generating fleet vehicle assignments and origination and destination fleet assignment model profit predictions from step 1;

(3) generating origination and destination yield management network profit prediction and bid prices based upon fleet vehicle assignments;

(4) comparing results of generated origination and destination fleet assignment model profit prediction to previously generated or produced origination and destination network profit prediction;

(5) generating a revenue approximation if previously generated or produced origination and destination fleet assignment model profit prediction and previously generated or produced origination and destination network profit prediction results are outside of a predetermined range; and determining an appropriate integer assignment if the fleet assignment model profit prediction and previously generated origination and destination network profit prediction results are within a predetermined range.

18. The method of claim 17 further comprising the step of generating an estimated expected network profit having once determined an appropriate integer assignment.

* * * * *